(12) United States Patent
Hsieh et al.

(10) Patent No.: US 10,585,276 B2
(45) Date of Patent: Mar. 10, 2020

(54) WAVELENGTH-CONVERTING WHEEL, ILLUMINATION SYSTEM, AND PROJECTION APPARATUS

(71) Applicant: Coretronic Corporation, Hsin-Chu (TW)

(72) Inventors: Chi-Tang Hsieh, Hsin-Chu (TW); Jo-Han Hsu, Hsin-Chu (TW); Chia-Lun Tsai, Hsin-Chu (TW); Hsin-Yueh Chang, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/361,239

(22) Filed: Mar. 22, 2019

(65) Prior Publication Data

US 2019/0361221 A1 Nov. 28, 2019

(30) Foreign Application Priority Data

May 24, 2018 (CN) ...................... 2018 2 0780921 U

(51) Int. Cl.
*G03B 21/14* (2006.01)
*H04N 9/31* (2006.01)
(Continued)

(52) U.S. Cl.
CPC .......... *G02B 26/008* (2013.01); *F21S 10/007* (2013.01); *G03B 21/2033* (2013.01);
(Continued)

(58) Field of Classification Search
CPC . F21S 10/007; G03B 21/204; G03B 21/2033; G03B 21/2066; H04N 9/3161;
(Continued)

(56) References Cited

U.S. PATENT DOCUMENTS 9,207,525 B2 12/2015 Chang et al.
10,281,808 B2 * 5/2019 Hsu ........................ G03B 33/08
(Continued)

FOREIGN PATENT DOCUMENTS

TW 201447464 A 12/2014
TW 201733170 A 9/2017

*Primary Examiner* — William C. Dowling

(57) ABSTRACT

A wavelength-converting wheel, for converting an excitation beam having an output power greater than or equal to 100 W into a conversion beam, is provided. The wavelength-converting wheel includes a turntable having an annular irradiation portion, an adhesive layer disposed at the annular irradiation portion, a reflective layer disposed on the adhesive layer, and a wavelength-converting layer. The wavelength-converting layer is disposed on the reflective layer and has a light receiving surface configured to be irradiated by the excitation beam. The invention further provides an illumination system including the wavelength-converting wheel, and a projection apparatus including the illumination system. The heat dissipating ability of the wavelength-converting wheel is improved. The material of the wavelength-converting layer is not deteriorated or damaged due to the heat of the excitation beam. The wavelength-converting layer has improved wavelength conversion efficiency and can effectively convert a high output power excitation beam into a conversion beam.

13 Claims, 5 Drawing Sheets

(51) Int. Cl.
*G02B 26/00* (2006.01)
*F21S 10/00* (2006.01)
*G03B 21/20* (2006.01)
*F21Y 115/30* (2016.01)
*F21Y 115/10* (2016.01)

(52) U.S. Cl.
CPC ....... *G03B 21/2066* (2013.01); *H04N 9/3158* (2013.01); *F21Y 2115/10* (2016.08); *F21Y 2115/30* (2016.08)

(58) Field of Classification Search
CPC ... H04N 9/3144; H04N 9/3114; G02B 26/008
See application file for complete search history.

(56) References Cited

U.S. PATENT DOCUMENTS

| | | | |
|---|---|---|---|
| 10,423,054 B2* | 9/2019 | Tsai | G02B 26/008 |
| 2014/0043829 A1* | 2/2014 | Wu | F21V 13/08 |
| | | | 362/324 |
| 2017/0059979 A1* | 3/2017 | Hsu | G03B 21/204 |
| 2018/0108814 A1* | 4/2018 | Zheng | H01L 33/502 |
| 2019/0146318 A1* | 5/2019 | Hsieh | G03B 21/204 |
| | | | 362/84 |
| 2019/0249833 A1* | 8/2019 | Hsu | G03B 21/204 |
| 2019/0331989 A1* | 10/2019 | Chen | G03B 21/16 |
| 2019/0353994 A1* | 11/2019 | Hsu | G03B 21/16 |

* cited by examiner

WAVELENGTH-CONVERTING WHEEL, ILLUMINATION SYSTEM, AND PROJECTION APPARATUS

CROSS-REFERENCE TO RELATED APPLICATION

THIS APPLICATION CLAIMS THE PRIORITY BENEFIT OF CHINA APPLICATION (CN201820780921.8 FILED ON 2018 May 24). THE ENTIRETY OF THE ABOVE-MENTIONED PATENT APPLICATION IS HEREBY INCORPORATED BY REFERENCE HEREIN AND MADE A PART OF THIS SPECIFICATION.

FIELD OF THE INVENTION

The invention relates to a wavelength-converting wheel, an illumination system, and a projection apparatus.

BACKGROUND OF THE INVENTION

With the market demands for brightness, color saturation, service life, non-toxicity and environmental protection of the projection apparatus, the type of the light source applied on the projection apparatus is evolved from an ultra-high pressure mercury lamp (UHP lamp), a light emitting diode (LED) to a laser diode (LD).

Currently, the costs of high-brightness red laser diodes and green laser diodes are still high. To reduce the cost, a blue laser diode is usually applied to excite the wavelength-converting material on a phosphor wheel to convert a blue light into a yellow light and a green light, and another part of the blue light is reflected by or penetrates through the phosphor wheel. A desired red light is filtered by a filter wheel, and then combined with the reflected or penetrated blue light to constitute the three primary colors of red, green, and blue required for the projection images.

Conventional wavelength-converting materials of the phosphor wheel are phosphor powders. The phosphor powders are usually gathered and fixed on a turntable of the phosphor wheel by an adhesive. In a common way provided at present, the phosphor powders are distributed in an organic adhesive to form an adhesive mixture, and then the adhesive mixture is coated on the turntable by printing or dispensing to form a wavelength-converting layer. The coating process above is quite convenient; however, compared with the phosphor powder, the heat conductivity of the organic adhesive is relatively low. The organic adhesive, such as silicone, has a heat conductivity of 0.1 watt per meter Kelvin ($Wm^{-1}k^{-1}$) to 0.2 $Wm^{-1}k^{-1}$. The phosphor powder, such as yttrium aluminium garnet (YAG), has a heat conductivity of 8.8 $Wm^{-1}k^{-1}$ to 13.0 $Wm^{-1}k^{-1}$. When a laser having a high output power (for example, 100 watts), irradiates on the wavelength-converting layer, as a result of the poor heat conduction of the organic adhesive, the heat accumulates rapidly in the wavelength-converting layer and causes a thermal quenching effect, thereby lowering the wavelength-converting efficiency of the wavelength-converting layer. When the wavelength conversion efficiency is lowered, more heat accumulates in the wavelength-converting layer so that the wavelength conversion efficiency is further lowered. This is a vicious circle. The wavelength-converting layer is unable to dissipate the accumulated heat, thereby causing the organic adhesive of the wavelength-converting layer to be deteriorated and burned black, and resulting in deterioration of the wavelength conversion efficiency of the wavelength-converting layer. Eventually, the wavelength-converting layer may lose the wavelength conversion capability due to the vicious circle.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art.

SUMMARY OF THE INVENTION

The invention provides a wavelength-converting wheel, which can improve wavelength conversion efficiency.

The invention provides an illumination system, whose wavelength-converting wheel can improve wavelength conversion efficiency.

The invention provides a projection apparatus, whose wavelength-converting wheel can improve wavelength conversion efficiency.

Other objectives and advantages of the invention can be further understood from the technical features disclosed by the invention.

In order to achieve one or partial or all of the above or other objectives, an embodiment of the invention provides a wavelength-converting wheel being configured to convert an excitation beam having an output power greater than or equal to 100 watts (W) into a conversion beam. The wavelength-converting wheel includes a turntable, an adhesive layer, a reflective layer, and a wavelength-converting layer. The turntable has an annular irradiation portion. The adhesive layer is disposed at the annular irradiation portion. The reflective layer is disposed on the adhesive layer. The wavelength-converting layer is disposed on the reflective layer and has a light receiving surface. The light receiving surface is configured to be irradiated by the excitation beam. A maximum thickness of the wavelength-converting layer is less than or equal to 0.1 millimeter (mm).

In order to achieve one or partial or all of the above or other objectives, an embodiment of the invention provides an illumination system being configured to provide an illuminating beam and including an excitation light source and the wavelength-converting wheel. The excitation light source is configured to provide the excitation beam. The wavelength-converting wheel is disposed on a transmission path of the excitation beam. The illuminating beam includes the conversion beam.

In order to achieve one or partial or all of the above or other objectives, an embodiment of the invention provides a projection apparatus including the illumination system, a light valve, and a projection lens. The light valve is disposed on a transmission path of the illuminating beam provided by the illumination system to convert the illuminating beam into an image beam. The projection lens is disposed on a transmission path of the image beam.

In summary, in the projection apparatus, the illumination system, and the wavelength-converting wheel of the embodiment of the invention, by the wavelength-converting layer which has the maximum thickness less than or equal to 0.1 mm, the heat dissipating ability of the wavelength-converting wheel is improved. Therefore, when the wavelength-converting wheel is irradiated by the excitation beam having the output power greater than or equal to 100 W, the material of the wavelength-converting layer is not deteriorated or damaged due to the heat. Accordingly, the wavelength conversion efficiency of the wavelength-converting layer under an excitation beam having a high output power is improved, and the wavelength-converting layer can effectively convert the excitation beam having a high output power into a conversion beam.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the present invention may be practiced. In this regard, directional terminology, such as "top", "bottom", "front", "back", etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
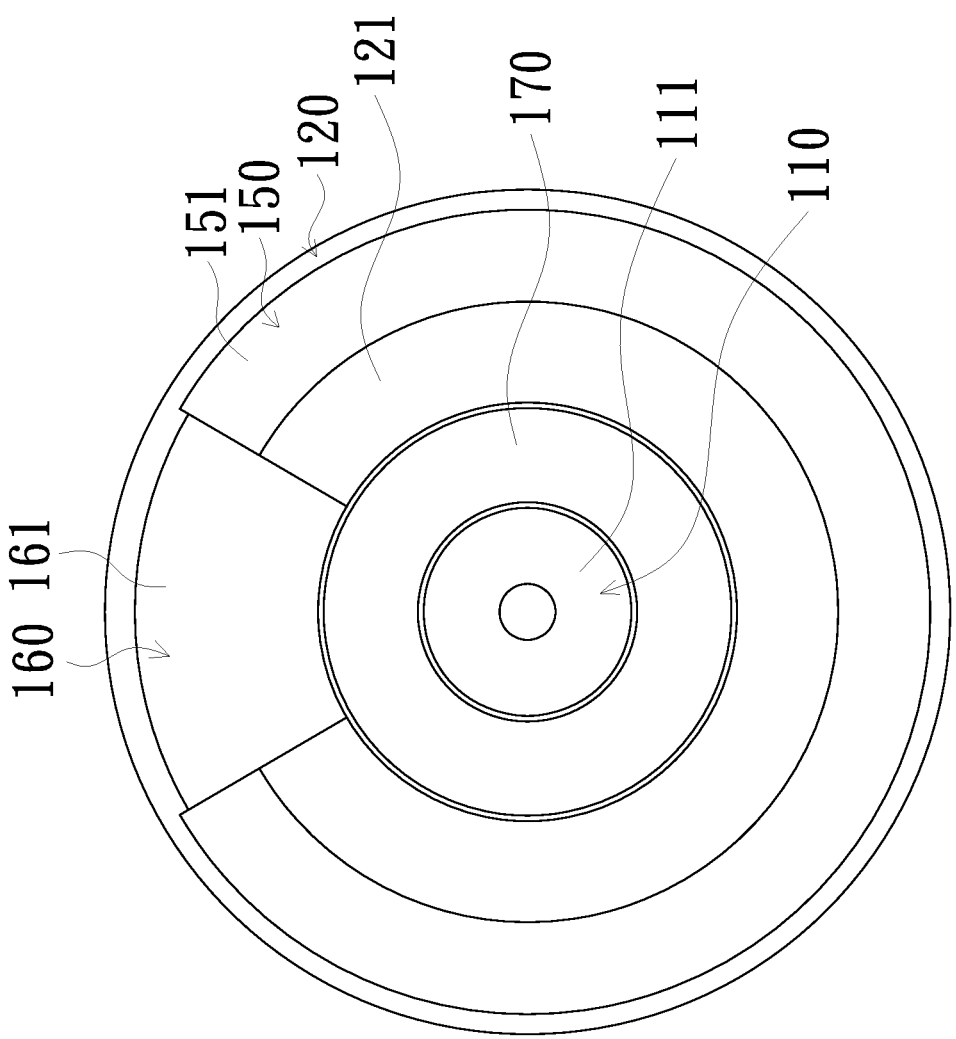
FIG. 1 is a schematic view of a wavelength-converting wheel according to a first embodiment of the invention.
Figure 2:
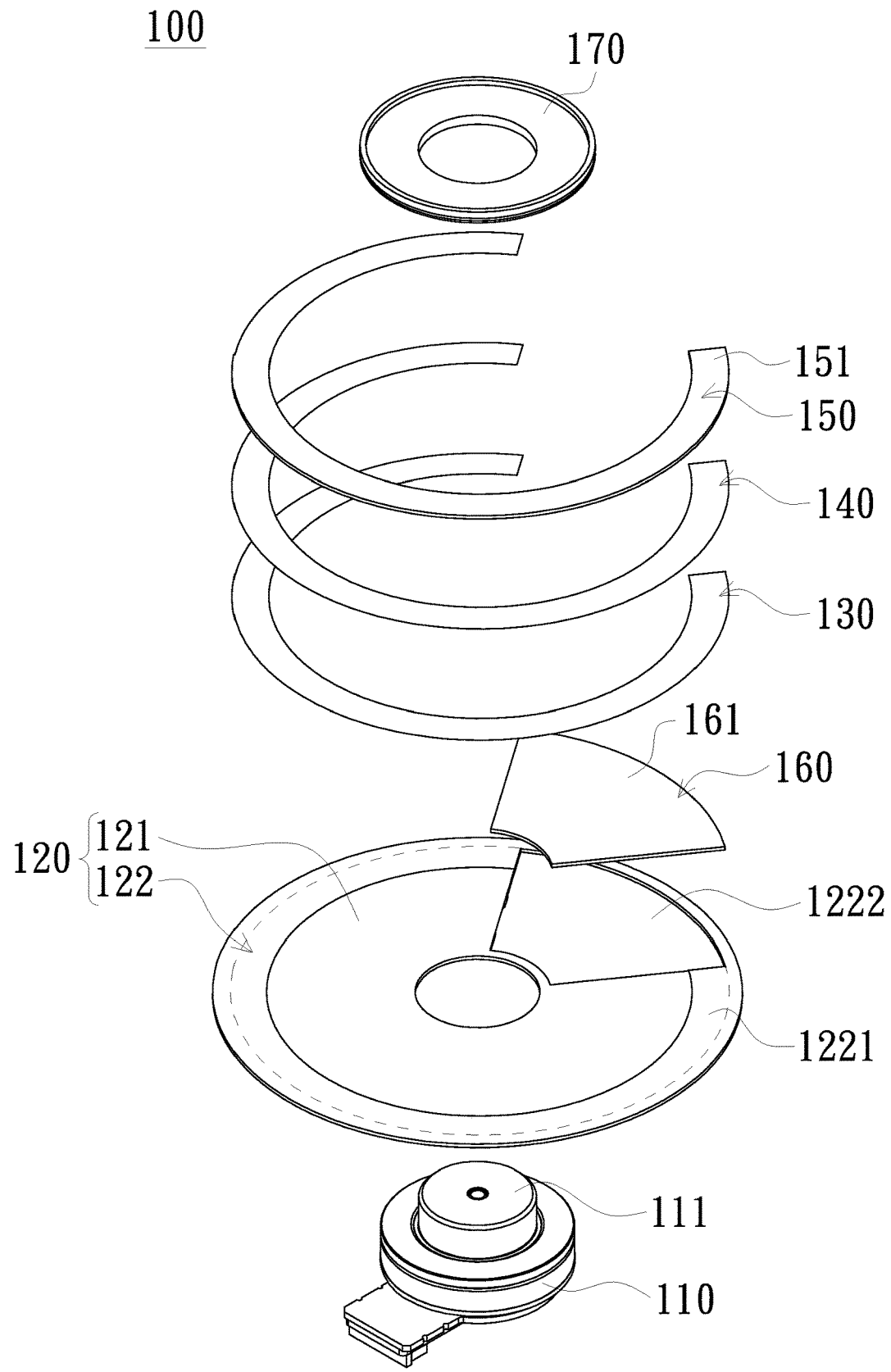
FIG. 2 is an exploded schematic view of the wavelength-converting wheel shown in FIG. 1.
Figure 3:
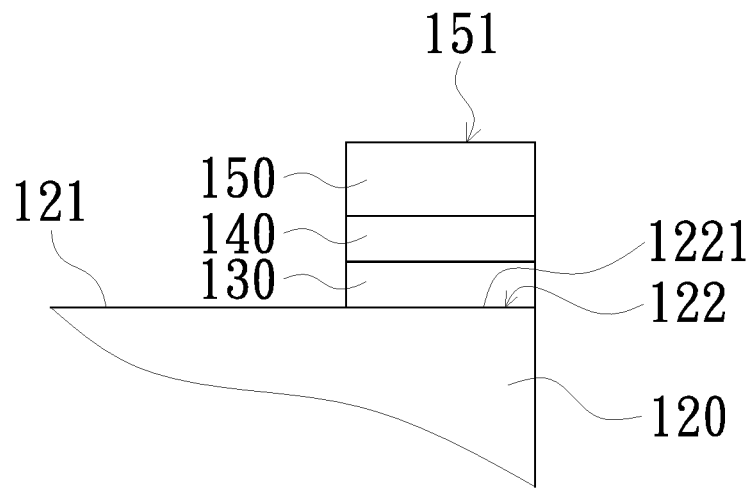
FIG. 3 is a partial cross-sectional schematic view of the wavelength-converting wheel shown in FIG. 1.

FIG. 1 is a schematic view of a wavelength-converting wheel according to a first embodiment of the invention. FIG. 2 is an exploded schematic view of the wavelength-converting wheel shown in FIG. 1. FIG. 3 is a partial cross-sectional schematic view of the wavelength-converting wheel shown in FIG. 1. Referring to FIGS. 1 and 2, the wavelength-converting wheel 100 in the embodiment includes a turntable 120, an adhesive layer 130, a reflective layer 140, and a wavelength-converting layer 150. The wavelength-converting wheel 100 is configured to convert an excitation beam having an output power greater than or equal to 100 watts into a conversion beam. The turntable 120 has an annular irradiation portion 122. The turntable 120 is, for example, a metal turntable, the material of which is, for example, aluminum, copper, or silver, but the invention is not limited thereto. The annular irradiation portion 122 refers to a preset region that can be irradiated by the excitation beam. The annular irradiation portion 122 includes a wavelength-converting region 1221. The adhesive layer 130 is disposed on the wavelength-converting region 1221 of the annular irradiation portion 122. The reflective layer 140 is disposed on the adhesive layer 130 and is configured to reflect or scatter the excitation beam passing through the wavelength-converting layer 150 back to the wavelength-converting layer 150 to increase the wavelength conversion efficiency. The wavelength-converting layer 150 is disposed on the reflective layer 140 and has a light receiving surface 151. The light receiving surface 151 is configured to be irradiated by the excitation beam. The material of the wavelength-converting layer 150 may be phosphor materials such as fluorescent materials, phosphors, or nano materials such as quantum dots, but the invention is not limited thereto. The wavelength-converting layer 150 may also include a plurality of blocks. The blocks are disposed with wavelength-converting materials that can be excited to generate beams of different colors, respectively. In addition, the wavelength-converting wheel 100 may further include a motor 110, a reflective element 160, and a fixing ring 170. The motor 110 has a rotating shaft 111. The turntable 120 may further have an inner ring portion 121. The inner ring portion 121 is sleeved on the rotating shaft 111. The annular irradiation portion 122 is connected to the inner ring portion 121. The annular irradiation portion 122 may further include a light reflecting region 1222. The light reflecting region 1222 is adjacent to the wavelength-converting region 1221. The reflective element 160 is disposed on the light reflecting region 1222 and has a reflective surface. The fixing ring 170 is sleeved on the rotating shaft 111, so as to fix the inner ring portion 121 of the turntable 120 between the fixing ring 170 and the motor 110. In the embodiment, the light reflecting region 1222 may also be located in the inner ring portion 121.

The wavelength-converting layer 150 has a maximum thickness less than or equal to 0.1 mm. For example, the maximum thickness of the wavelength-converting layer 150 may be 0.01 mm, 0.03 mm, 0.05 mm, 0.07 mm, or 0.1 mm.

The material of the adhesive layer 130 may be an organic adhesive, or an inorganic adhesive. The organic adhesive is, for example, silicone. The heat conductivity of the adhesive layer 130 is greater than 0.1 $Wm^{-1}k^{-1}$, such as 0.2 $Wm^{-1}k^{-1}$, 0.5 $Wm^{-1}k^{-1}$, 1.5 $Wm^{-1}k^{-1}$, or 3.0 $Wm^{-1}k^{-1}$.

The reflective layer 140 may be a silver reflective layer, but the invention is not limited thereto. In other embodiments, the reflective layer 140 may be a scattering particle reflection layer which has scattering particles such as titanium dioxide ($TiO_2$), zirconium dioxide ($ZrO_2$), but the invention is not limited thereto. The thickness of the scattering particle reflection layer is greater than 0.1 mm, such as 0.2 mm, 0.5 mm, 1.0 mm, or 2.0 mm.

The light reflecting region 1222 is, for example, an opening disposed on the annular irradiation portion 122 of the turntable 120. The reflective element 160 includes a glass substrate (not shown in the figures) and a reflective film 161. The glass substrate of the reflective element 160 is embedded in the opening (the light reflecting region 1222), and the reflective film 161 is disposed on the glass substrate. The material of the reflective film 161 includes, for example, materials having reflection function such as metal, but the invention is not limited thereto.

An experimental embodiment is provided below to illustrate the advantages that the wavelength-converting wheel 100 of the first embodiment may achieve. In the experimental example, a wavelength-converting wheel of a comparative embodiment was compared with the wavelength-converting wheel 100 of the first embodiment. The wavelength-converting wheel of the comparative embodiment differed from the wavelength-converting wheel 100 of the first embodiment in that: the maximum thickness of a wavelength-converting layer of the wavelength-converting wheel in the comparative embodiment was 0.15 mm; whereas, the maximum thickness of a wavelength-converting layer of the wavelength-converting wheel in the first embodiment was 0.1 mm. In the experimental example, blue lasers (excitation beams) having output powers of 75 W and 100 W irradiated on the wavelength-converting wheel of the comparative embodiment and the wavelength-converting wheel of the first embodiment, and the brightness of the conversion beams produced by the wavelength-converting wheels of the comparative embodiment and the first embodiment were compared. Under the irradiation of the blue lasers of the same output power, the wavelength-converting wheel which produced the conversion beam with higher brightness had better wavelength conversion efficiency. The experimental results of this experimental embodiment are shown in Table 1 and Table 2.

Referring to Table 1, under the irradiation of the excitation beam having a low output power (a 75 W blue laser), the brightness of the conversion beams generated by the wavelength-converting wheels of the first embodiment and the comparative embodiment are equivalent. Referring to Table 2, under the irradiation of the excitation beam having a high output power (a 100 W blue laser), the brightness of the conversion beam generated by the wavelength-converting wheel 100 of the first embodiment is increased by 2% compared to the wavelength-converting wheel of the comparative embodiment. Thus, one may see that the wavelength conversion efficiency of the wavelength-converting wheel 100 of the first embodiment is better than the wavelength conversion efficiency of the wavelength-converting wheel of the comparative embodiment, and one may infer that the heat dissipating ability of the wavelength-converting wheel 100 of the first embodiment is better than the heat dissipating ability of the wavelength-converting wheel of the comparative embodiment.

TABLE 1

Experimental results of the experimental embodiment, wherein the excitation beam is a 75 W blue laser.

| | Maximum thickness of the wavelength-converting layer 150 | Brightness of the conversion beam |
|---|---|---|
| First embodiment | 0.1 mm | 100% |
| Comparative embodiment | 0.15 mm | 100% |

TABLE 2

Experimental results of the experimental embodiment, wherein the excitation beam is a 100 W blue laser.

| | Maximum thickness of the wavelength-converting layer 150 | Brightness of the conversion beam |
|---|---|---|
| First embodiment | 0.1 mm | 102% |
| Comparative embodiment | 0.15 mm | 100% |

From above, by the wavelength-converting layer 150 which has the maximum thickness less than or equal to 0.1 mm, the wavelength-converting wheel 100 of the first embodiment has a good heat dissipating ability, and thereby the wavelength-converting wheel 100 of the first embodiment may not only convert an excitation beam having the output power less than 100 W (for example, an output power of 75 W) into a conversion beam, but also convert an excitation beam having the output power greater than or equal to 100 W into a conversion beam. In addition, compared with the wavelength-converting wheel having the wavelength-converting layer with a maximum thickness greater than 0.1 mm (the comparative embodiment), the wavelength-converting wheel 100 of the first embodiment may achieve better wavelength conversion efficiency under the irradiation of an excitation beam having a high output power (for example, an output power of 100 W). Therefore, the wavelength-converting wheel 100 of the first embodiment has a good heat dissipating ability, and can maintain good wavelength conversion efficiency for converting an excitation beam having an output power greater than or equal to 100 W into a conversion beam.

Figure 4:
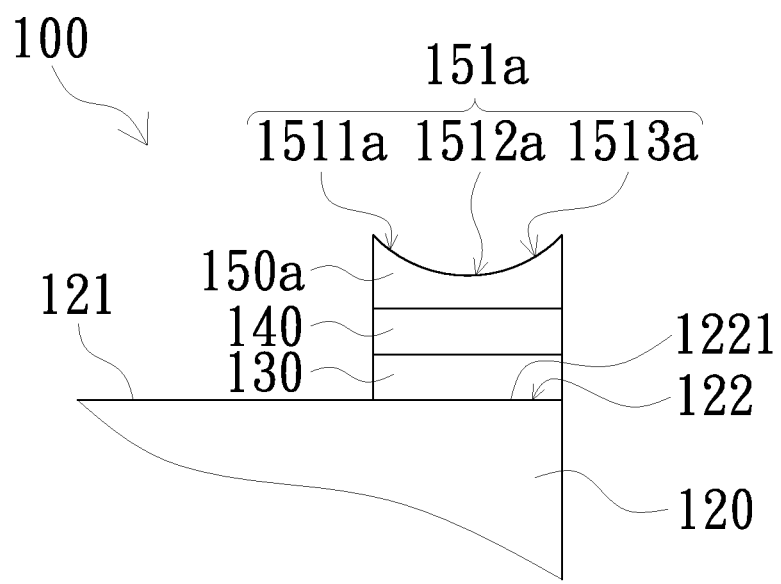
FIG. 4 is a partial cross-sectional schematic view of a wavelength-converting wheel according to a second embodiment of the invention.

FIG. 4 is a partial cross-sectional schematic view of a wavelength-converting wheel according to a second embodiment of the invention. Referring to FIG. 4, in the wavelength-converting wheel 100 of the embodiment, the light receiving surface 151a of the wavelength-converting layer 150a has an inside portion 1511a, a central portion 1512a, and an outside portion 1513a. The inside portion 1511a, the central portion 1512a, and the outside portion 1513a are arranged in sequence along a radial direction of the turntable 120. The inside portion 1511a is disposed between the inner ring portion 121 and the central portion 1512a. The thickness of the wavelength-converting layer 150a at the inside portion 1511a is greater than the thickness of the wavelength-converting layer 150a at the central portion 1512a. The thickness of the wavelength-converting layer 150a at the outside portion 1513a is greater than the thickness of the wavelength-converting layer 150a at the central portion 1512a.

Generally, the energy density distribution of a speckle of an excitation beam exhibits a Gaussian distribution without a light homogenizer; that is, the energy at the center of the speckle is the strongest, and the energy is gradually weakened away from the center of the speckle. In the wavelength-converting wheel 100 of the embodiment, the central portion 1512a of the wavelength-converting layer 150a is preset to correspond to the part having the strongest energy in the speckle of the excitation beam (the center of the speckle). By the configuration that the thickness of the wavelength-converting layer 150a at the inside portion 1511a is greater than the thickness of the wavelength-converting layer 150a at the central portion 1512a, and the thickness of the wavelength-converting layer 150a at the outside portion 1513a is greater than the thickness of the wavelength-converting layer 150a at the central portion 1512a, the heat of the excitation beam can arrive at the turntable 120 rapidly through the wavelength-converting layer 150a, the reflective layer 140 and the adhesive layer 130, and be dissipated from the turntable 120 when the excitation beam irradiates on the central portion 1512a.

Figure 5:
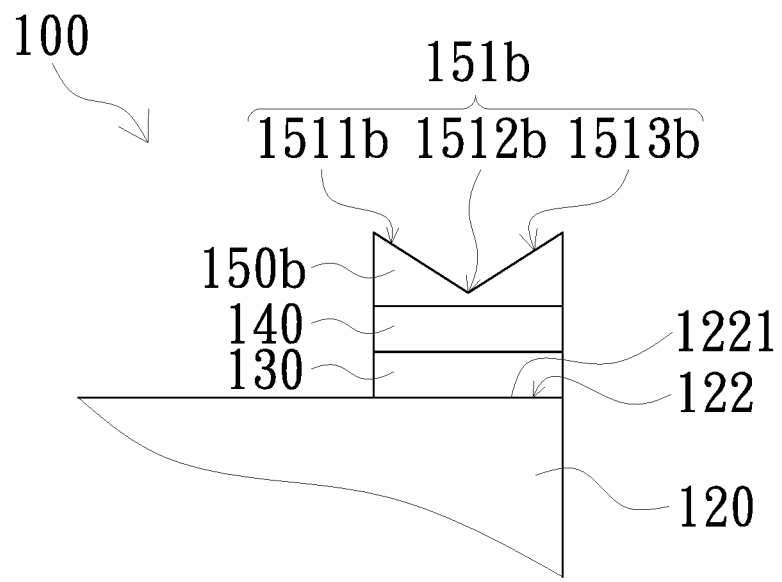
FIG. 5 is a partial cross-sectional schematic view of a wavelength-converting wheel according to a third embodiment of the invention.

FIG. 5 is a partial cross-sectional schematic view of a wavelength-converting wheel according to a third embodiment of the invention. Referring to FIG. 4, the thicknesses of the wavelength-converting layer 150a in the second embodiment increase gradually from the central portion 1512a toward the inside portion 1511a and the outside portion 1513a, and the light receiving surface 151a is arc-shaped, but the invention is not limited thereto. Referring to FIG. 5, the shape of the light receiving surface 151b of the wavelength-converting layer 150b may also be a concavely bending surface having a bending angle. In other embodiments, the light receiving surface may also be a concavely bending surface having a plurality of bending angles.

Figure 6:
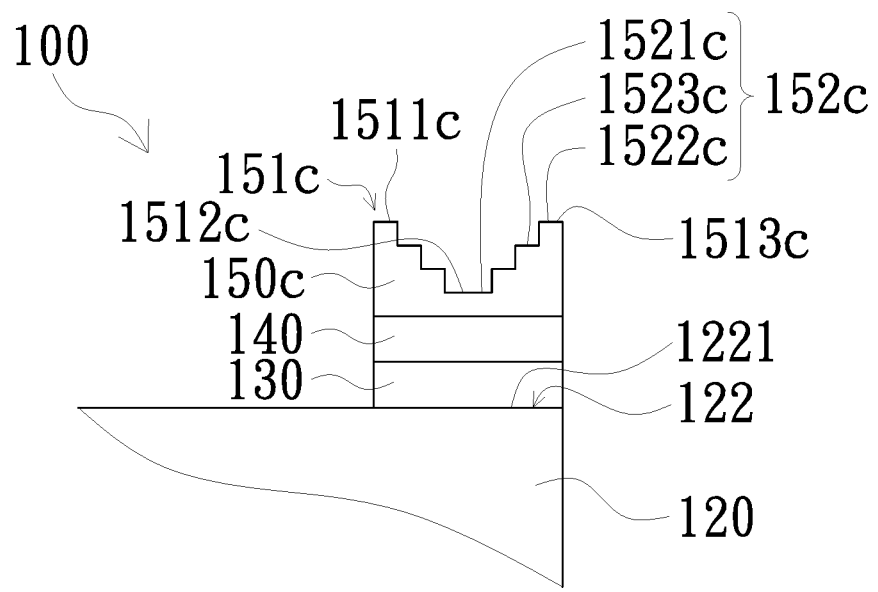
FIG. 6 is a partial cross-sectional schematic view of a wavelength-converting wheel according to a fourth embodiment of the invention.

FIG. 6 is a partial cross-sectional schematic view of a wavelength-converting wheel according to a fourth embodiment of the invention. Referring to FIG. 6, the light receiving surface 151c of the wavelength-converting wheel 100 in the embodiment includes two stair portions 152c. Each of the stair portions 152c has a lower edge 1521c, an upper edge 1522c opposite to the lower edge 1521c, and a step surface 1523c disposed between the lower edge 1521c and the upper edge 1522c. A level height of the upper edge 1522c is higher than a level height of the lower edge 1521c. The lower edges 1521c of the stair portions 152c are connected at the central portion 1512c. The upper edges 1522c of the stair portions 152c are adjacent to the inside portion 1511c and the outside portion 1513c respectively. The number of the step surface 1523c of each of the stair portions 152c may be one or more. In the embodiment, each of the stair portions 152c is exemplified to have a plurality of step surfaces 1523c. In each of the stair portions 152c, the step surfaces 1523c are disposed between the lower edge 1521c and the upper edge 1522c in sequence, and the level heights of the step surfaces 1523c are sequentially increased from the lower edge 1521c toward the upper edge 1522c.

In the wavelength-converting wheels 100 of the third embodiment and the fourth embodiment, the central portions 1512b and 1512c of the light receiving surfaces 151b and 151c of the wavelength-converting layers 150b and 150c are preset to correspond to the part having the strongest energy in the speckle of the excitation beam (the center of the speckle). The shapes of the light receiving surfaces 151b, 151c in the third and the fourth embodiments are not identical to each other, but are similar to the second embodiment in that: the thicknesses of the wavelength-converting layers 150b, 150c at the inside portions 1511b, 1511c are greater than the thicknesses of the wavelength-converting layers 150b, 150c at the central portions 1512b, 1512c in the third and the fourth embodiments, and the thicknesses of the wavelength-converting layers 150b, 150c at the outside portions 1513b, 1513c are greater than the thicknesses of the wavelength-converting layers 150b, 150c at the central portions 1512b, 1512c in the third and the fourth embodiments. Accordingly, the heat of the excitation beams can arrive at the turntables 120 rapidly through the wavelength-converting layers 150b, 150c, the reflective layers 140 and the adhesive layers 130, and be dissipated from the turntables 120 when the excitation beams irradiate on the central portions 1512b, 1512c.

Figure 7:
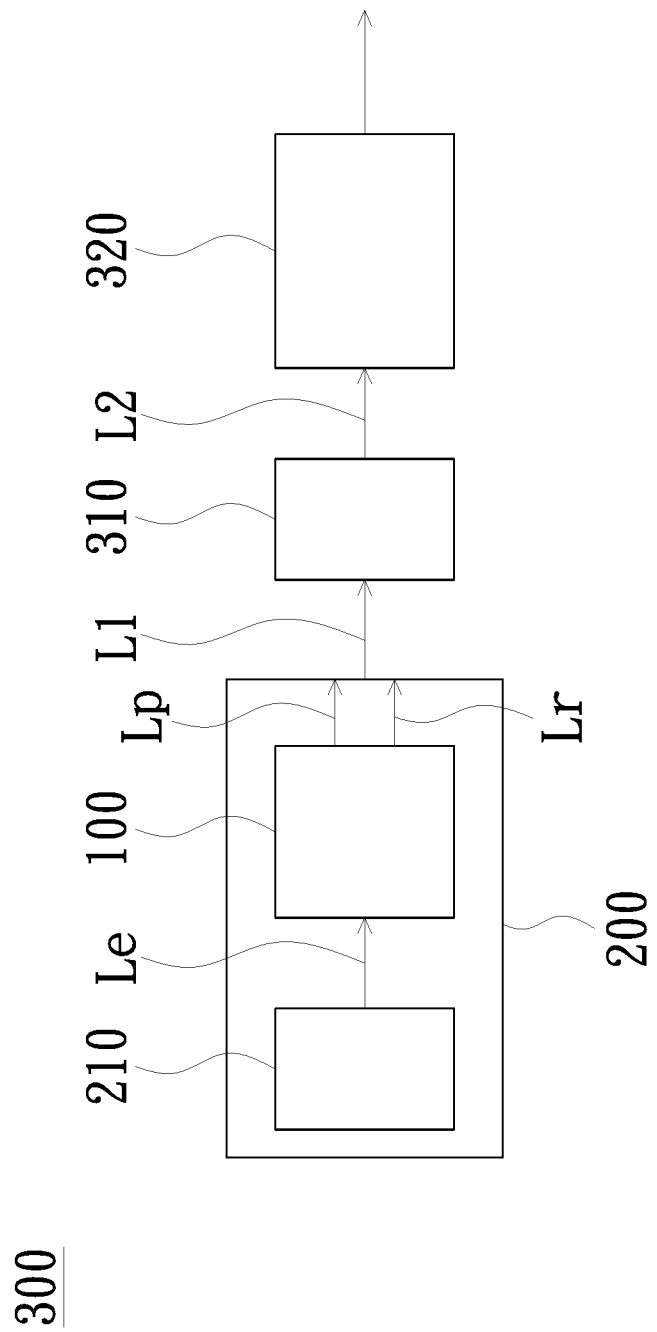
FIG. 7 is a schematic block diagram of a projection apparatus according to an embodiment of the invention.

FIG. 7 is a schematic block diagram of a projection apparatus according to an embodiment of the invention. Referring to FIGS. 1, 2, 3, and 7, the projection apparatus 300 of the embodiment includes an illumination system 200, a light valve 310, and a projection lens 320.

The illumination system 200 is configured to provide an illuminating beam L1 and includes an excitation light source 210 and a wavelength-converting wheel 100. The excitation light source 210 is configured to provide an excitation beam Le having an output power greater than or equal to 100 W. The excitation light source 210 is a diode module including a light emitting diode or a laser diode (LD), or an array composed of a plurality of diode modules, but the invention is not limited thereto. The wavelength-converting wheel 100 is disposed on the transmission path of the excitation beam Le. Although FIG. 6 illustrates the wavelength-converting wheel 100 of FIG. 1, FIG. 2 and FIG. 3 as an example, the wavelength-converting wheel 100 may be replaced with the wavelength-converting wheel 100 of any one of the above-mentioned embodiments.

The excitation beam Le is configured to irradiate on the annular irradiation portion 122 of the wavelength-converting wheel 100. As the wavelength-converting wheel 100 rotates around the rotating shaft 111, the wavelength-converting layer 150 on the annular irradiation portion 122 is configured to convert the excitation beam Le into a conversion beam Lp, and then the conversion beam Lp is reflected by the reflective layer 140 and/or the annular irradiation portion 122 of the metal turntable. The wavelength of the conversion beam Lp is different from the wavelength of the excitation beam Le, and the reflective element 160 is configured to reflect the excitation beam Le (in FIG. 6, Lr denotes the excitation beam reflected by the reflective element 160). The illuminating beam L1 includes the conversion beam Lp and the excitation beam Lr reflected by the reflective element 160.

The light valve 310 is disposed on the transmission path of the illuminating beam L1 to convert the illuminating beam L1 into an image beam L2. The projection lens 320 is disposed on the transmission path of the image beam L2 to project the image beam L2 onto a screen, so as to form an image on the screen. The light valve 310 may be a transmissive light valve or a reflective light valve, wherein the transmissive light valve may be a transmissive liquid crystal panel, and the reflective light valve may be a digital micro-mirror device (DMD), or a liquid crystal on silicon (LCOS) panel, but the invention is not limited thereto. The projection lens 320 includes, for example, a combination of one or more optical lenses having dioptric power, such as various combinations of non-planar lenses including biconcave lenses, biconvex lenses, concavo-convex lenses, convexo-concave lenses, plano-convex lenses, and plano-concave lenses. In an embodiment, the projection lens 320 may also include a planar optical lens. The arrangement and type of the projection lens 320 are not limited in the invention. In addition, the illumination system 200 may further include other optical elements, such as a light combining element, a filter wheel, a light homogenizing element, and a condenser lens, to transmit the illuminating beam L1 to the light valve 310.

In summary, in the projection apparatus, the illumination system, and the wavelength-converting wheel of the embodiments of the invention, by the wavelength-converting layer having the maximum thickness less than or equal to 0.1 mm, the heat dissipating ability of the wavelength-converting wheel is improved. Hence, under the irradiation of an excitation beam having an output power greater than or equal to 100 W, the material of the wavelength-converting layer is not deteriorated or damaged due to the heat. Accordingly, the wavelength-converting layer can maintain good wavelength conversion efficiency, and effectively convert the excitation beam having the output power greater than or equal to 100 W into a conversion beam.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "The invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims.

What is claimed is:

1. A wavelength-converting wheel, configured to convert an excitation beam having an output power greater than or equal to 100 W into a conversion beam, wherein the wavelength-converting wheel comprises:
   a turntable, having an annular irradiation portion;
   an adhesive layer, disposed at the annular irradiation portion;
   a reflective layer, disposed on the adhesive layer; and
   a wavelength-converting layer, disposed on the reflective layer and having a light receiving surface, wherein the light receiving surface is configured to be irradiated by the excitation beam, and a maximum thickness of the wavelength-converting layer is less than or equal to 0.1 mm.

2. The wavelength-converting wheel according to claim 1, wherein the light receiving surface has an inside portion, a central portion, and an outside portion, the inside portion, the central portion, and the outside portion are arranged in sequence along a radial direction of the turntable, a thickness of the wavelength-converting layer at the inside portion is greater than a thickness of the wavelength-converting layer at the central portion, and a thickness of the wavelength-converting layer at the outside portion is greater than the thickness of the wavelength-converting layer at the central portion.

3. The wavelength-converting wheel according to claim 2, wherein thicknesses of the wavelength-converting layer increase gradually from the central portion toward the inside portion and the outside portion.

4. The wavelength-converting wheel according to claim 3, wherein the light receiving surface comprises two stair portions, each of the two stair portions has a lower edge, an upper edge opposite to the lower edge, and at least one step surface disposed between the lower edge and the upper edge, a level height of the upper edge is higher than a level height of the lower edge, the lower edges of the two stair portions are connected at the central portion, and the upper edges of the two stair portions are adjacent to the inside portion and the outside portion respectively.

5. The wavelength-converting wheel according to claim 1, wherein the reflective layer comprises scattering particles, and a thickness of the reflective layer is greater than 0.1 mm.

6. The wavelength-converting wheel according to claim 1, wherein a heat conductivity of the adhesive layer is greater than 0.1 $Wm^{-1}k^{-1}$.

7. An illumination system, configured to provide an illuminating beam, wherein the illumination system comprises:
   an excitation light source, configured to provide an excitation beam having an output power greater than or equal to 100 W; and
   a wavelength-converting wheel, disposed on a transmission path of the excitation beam and configured to covert the excitation beam into a conversion beam, wherein the wavelength-converting wheel comprises:
   a turntable, having an annular irradiation portion;
   an adhesive layer, disposed at the annular irradiation portion;
   a reflective layer, disposed on the adhesive layer; and
   a wavelength-converting layer, disposed on the reflective layer and having a light receiving surface, wherein the light receiving surface is configured to be irradiated by the excitation beam, a maximum thickness of the wavelength-converting layer is less than or equal to 0.1 mm, and the illuminating beam comprises the conversion beam.

8. The illumination system according to claim 7, wherein the light receiving surface has an inside portion, a central portion, and an outside portion, the inside portion, the central portion, and the outside portion are arranged in sequence along a radial direction of the turntable, a thickness of the wavelength-converting layer at the inside portion is greater than a thickness of the wavelength-converting layer at the central portion, and a thickness of the wavelength-converting layer at the outside portion is greater than the thickness of the wavelength-converting layer at the central portion.

9. The illumination system according to claim 8, wherein thicknesses of the wavelength-converting layer increase gradually from the central portion toward the inside portion and the outside portion.

10. The illumination system according to claim 9, wherein the light receiving surface comprises two stair portions, each of the two stair portions has a lower edge, an upper edge opposite to the lower edge, and at least one step surface disposed between the lower edge and the upper edge, a level height of the upper edge is higher than a level height of the lower edge, the lower edges of the two stair portions are connected at the central portion, and the upper edges of the two stair portions are adjacent to the inside portion and the outside portion respectively.

11. The illumination system according to claim 7, wherein the reflective layer comprises scattering particles, and a thickness of the reflective layer is greater than 0.1 mm.

12. The illumination system according to claim 7, wherein a heat conductivity of the adhesive layer is greater than 0.1 $Wm^{-1}k^{-1}$.

13. A projection apparatus, comprising:
an illumination system, configured to provide an illuminating beam and comprising:
   an excitation light source, configured to provide an excitation beam having an output power greater than or equal to 100 W; and
   a wavelength-converting wheel, disposed on a transmission path of the excitation beam and configured to convert the excitation beam into a conversion beam, wherein the wavelength-converting wheel comprises:
     a turntable, having an annular irradiation portion;
     an adhesive layer, disposed at the annular irradiation portion;
     a reflective layer, disposed on the adhesive layer; and
     a wavelength-converting layer, disposed on the reflective layer and having a light receiving surface, wherein the light receiving surface is configured to be irradiated by the excitation beam, a maximum thickness of the wavelength-converting layer is less than or equal to 0.1 mm, and the illuminating beam comprises the conversion beam;
a light valve, disposed on a transmission path of the illuminating beam to convert the illuminating beam into an image beam; and
a projection lens, disposed on a transmission path of the image beam.

* * * * *